May 22, 1945.　　　E. A. CROSS　　　2,376,576
VACUUM LIFTING DEVICE
Filed Jan. 29, 1941　　　2 Sheets-Sheet 1
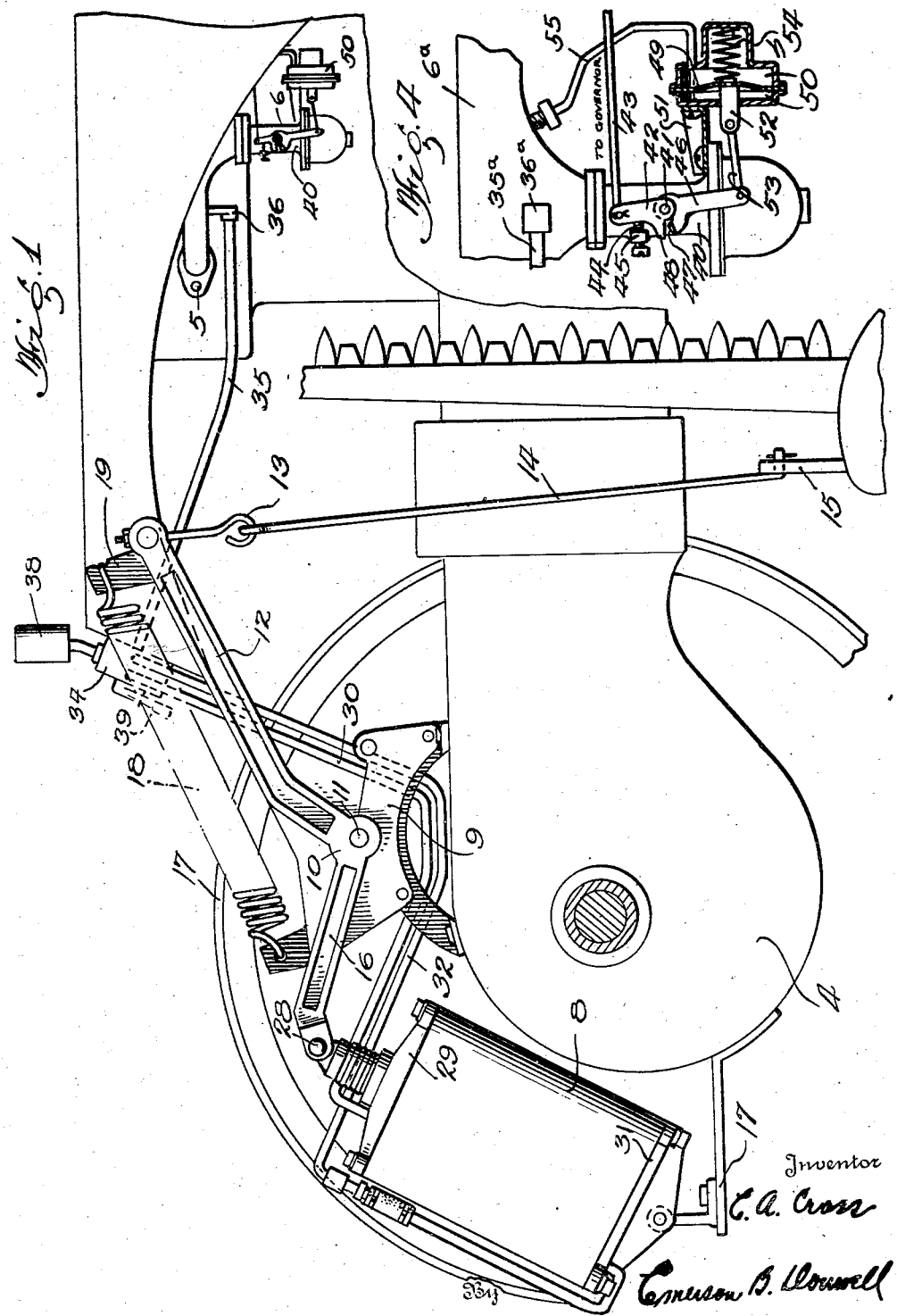

May 22, 1945.  E. A. CROSS  2,376,576
VACUUM LIFTING DEVICE
Filed Jan. 29, 1941   2 Sheets-Sheet 2
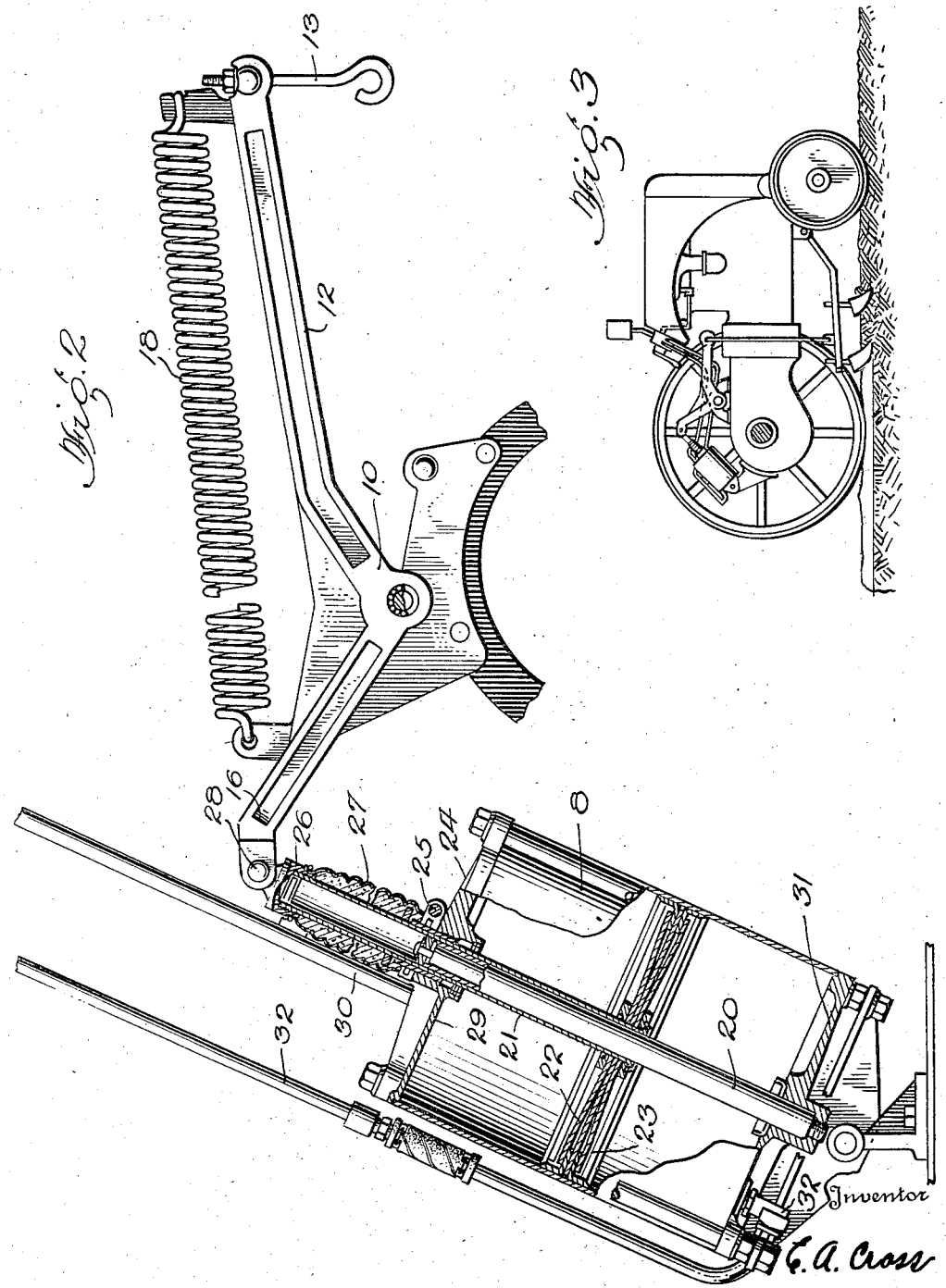

Patented May 22, 1945

2,376,576

UNITED STATES PATENT OFFICE 2,376,576

VACUUM LIFTING DEVICE

Edgar A. Cross, Greenwich, Ohio, assignor to J. I. Case Company, Racine, Wis., a corporation of Wisconsin Application January 29, 1941, Serial No. 376,529

2 Claims. (Cl. 56—10)

The following description relates to my invention in a vacuum lifting device adapted to form part of a motor vehicle and specifically to utilize the motive power of a tractor or the like for the purpose of adjusting the position of agricultural implements with which the tractor is used.

Tractors applied for agricultural purposes such as hauling plows, cultivators, mowers and the like form a desirable source of power likewise for operating such implements or for adjusting their position into and out of operating relationships.

It is an object of my invention to combine with such a tractor a vacuum motor having operative connections with an implement so that the power of the tractor may be applied to the implement for desired purposes.

It is an object of my invention to provide a novel and effective leverage for giving a long lift of low power or alternatively a short lift of greater power to the associated agricultural implement.

Incidental to my invention, I have provided novel means for increasing mechanically as by a spring, the power derived from the vacuum motor. Such added power may be provided primarily at one end of the power stroke for example at the beginning of the movement.

More specifically it is an object of my invention to provide such a vacuum motor connected for lifting and controlling a mower bar carried on the tractor.

A further object of my invention is to control the force of the vacuum applied by restricting or metering its connection with the prime mover. It will of course be evident that in carrying out this purpose I also protect the prime mover, in this case an internal combustion engine, from abnormal or excessive collapse of the vacuum in the intake manifold.

My improved vacuum lifting device includes an air cleaner as an element through which the atmospheric air is drawn to the vacuum motor and ultimately passes to the intake manifold. In this way, both the vacuum motor and the gas engine are supplied with air only in a cleaned condition.

A still further object of my invention is to provide force in either direction of travel, in one case with and in the other case against the force of the mechanical means.

A further object of my invention is to provide a novel expedient for compensating for any adverse effect which might otherwise be exerted on the tractor engine by the action of the vacuum motor.

Other objects of my invention will be evident from the following description of the preferred form of the embodiment as illustrated in the drawings in which Fig. 1 is a side elevation of a tractor embodying my improved vacuum lifting device;

Fig. 2 is an enlarged side elevation partly in section showing the vacuum motor and leverage;

Fig. 3 is a diagrammatic view of the invention as applied to a set of cultivator rigs, and Fig. 4 is a side elevation of a portion of Fig. 1 enlarged showing a modified arrangement for compensating for the loss of vacuum caused by the operation of the vacuum motor.

By way of illustrating the novel features of my device, I have shown a typical tractor vehicle having a frame 4. Mounted upon this frame is a prime mover 5 which may be an internal combustion engine. The intake manifold 6 of this gas engine normally provides a partial vacuum which may be drawn upon as a source of power without materially affecting the normal operation of the gas engine.

Mounted on some suitable part 7 of the frame, I have provided a vacuum cylinder 8.

On the top of the frame 4 is a support 9 upon which the operative parts of the device are mounted. These consist primarily of a lever or motion transmitting and modifying device 10 journaled on a shaft 11. One arm 12 of the lever extends forwardly and at its free end has a connecting eye bolt 13 from which connecting member 14 is suspended. It is by means of this member 14 that the adjusting bar 15 of an agricultural implement is moved from one to another position. For example, by elevating the bar 15 the blades of a mower may be lifted into inoperative position. The same movement may be used to lift cultivator rigs or other implements out of operative position.

The opposite arm 16 of the lever 10 extends backwardly over the upper end of the vacuum cylinder 8.

On a bracket 17 of the support 9 there is attached one end of a helical spring 18. The opposite end of this spring fits over an upstanding lug 19 on the free end 12 of the lever 10. In this way the spring forms a mechanical aid for example in initiating the lifting movement. Conversely it will serve to retard or cushion the lowering movement of the device when vacuum is applied for that purpose.

The motive power for shifting the bar 15 is supplied by the vacuum cylinder 8. As shown more particularly in Fig. 2 this cylinder has a central axial stem 20 which forms a journal for a hollow tubular piston rod 21. The lower end of the piston rod 21 has a piston head 22 with suitable packings 23, 23.

The upper end of the piston rod 21 extends through the head 24 of the cylinder through a rather close bearing 25. A cap 26 fits over the end of the piston rod 21 and is connected to the bearing 25 by means of a flexible and collapsible guard 27.

The cap 26 has a pivot pin 28 pivotally fitted within the end 16 of the lever 10.

The upper cylinder head 29 has a connecting pipe 30. The lower cylinder head 31 has a corresponding connecting pipe 32.

Flexible pipes 30 and 32 lead from a dash or panel board 33 upon which they are connected to opposite outlets of a two-way valve 34. Valve 34 is connected by piping 35 to a fitting 36 tapped into the inlet manifold 6. This fitting may have a restricted orifice by which the flow of air into the manifold is controlled or metered thus minimizing the effect upon the manifold vacuum and also controlling the rate at which the piston 22 moves.

The fourth connection 37 of the two-way valve leads to an air filter 38.

The valve lever 39 can be shifted to connect either pipe 30 or 32 with the vacuum line 35. Whichever pipe is not connected to the vacuum line will be normally connected with the air cleaner or filter 38.

It will thus be evident that the force of the atmospheric pressure will be applied on one or the other side of the piston 22 dependent upon the position of the lever 39. This force will be effective in proportion as the vacuum exists in the line 35 and the opposite chamber of the vacuum pump cylinder. In this way the lever 10 is held in one or the other limit of its movement and the position of the agricultural implement controlled accordingly.

Two-way valve 34 may be of any suitable type, but may advantageously have a middle or neutral position in which pipes 30 and 32 are closed so that no air is admitted to or extracted from either side of piston 22 when the valve is in this position. Under these conditions the piston, and accordingly lever 10 and any connected implement may be held in any desired position between its extreme positions, the elasticity of the fluid in cylinder 8 giving a yielding or cushioning quality to the support thus obtained. A mower bar, for example, may thus be caused to "float" over uneven ground, and, by opening valve 34 momentarily in the appropriate direction, any desired amount of yielding pressure may be exerted on the ground.

I have shown the force arm 16 to be less than that of the power arm 12. In such a case the lifting force applied to the bar 15 is less than that of the piston rod 21 but a greater sweep or lifting movement is obtainable. It is of course evident that by making the force arm 16 longer than the power arm 12 a shorter but more powerful lifting force will be applied.

The function of the coil spring 18 will be readily understood. When the arm 12 is in its lowermost position, the weight on the screw bolt 13 will place the spring 18 under tension. Thus the tension of the spring will reduce the amount of force which it is necessary for the piston rod 21 to apply to effectively lift the bar 15. As the bar starts to rise the tension spring 18 is reduced.

In the opposite movement the tension of the spring 18 increases as the arm 12 is lowered thus cushioning the stroke of the latter. Also the weight of the implement bar 15 will help in this movement and the vacuum force applied will thus be absorbed in part by placing the spring 18 under tension.

Although adverse influence on the running of engine 5 may be minimized by suitably selecting the bore of fitting 36 a larger bore may be used, and accordingly quicker action in cylinder 8 may be obtained by the use of a control of suitable type as for example that shown in Fig. 4, which operates to accelerate the engine momentarily when vacuum cylinder 8 is actuated, so that the flow of air into the intake manifold may be more rapid than would be permitted by a restricted bore without excessively diluting the mixture and causing the engine to stall.

As seen in Fig. 4, 6ª is the intake manifold, a pipe 35ª leading from a control valve such as 34. Pipe 35ª connects with manifold 6ª as by a fitting 36ª. Numeral 40 represents a carburetor of suitable type having a throttle shaft 41 on which is fixed a throttle actuating arm or member 42 actuated by a rod 43 extending to a governor of well-known type not shown. Arm 42 may abut a stop-screw 44 carried in a boss or the like 45 fixed on carburetor 40 to determine its idling position. Arm 42 will thus rest against screw 44 when the tractor engine is running at its minimum speed. Under these conditions actuation of the vacuum motor may cause the engine to stall if the bore in fitting 36ª is not sufficiently restricted. To prevent this means is provided for increasing the throttle opening somewhat at such times.

An arm 46 is journaled on throttle shaft 41 and has a finger or abutment 47 positioned to contact a boss or the like 48 on arm 42 upon clockwise movement of arm 46. Normally finger 47 is held out of contact with boss 48 by a vacuum actuated diaphragm 49 disposed in a casing 50 carried as by a bracket 51 and connected with arm 46 as by a tongue 52 and connecting rod or wire 53. Diaphragm 49 is urged to the left in Fig. 4 as by a spring 54, and to the right by atmospheric pressure, the vacuum in manifold 6ª being communicated to the right side of diaphragm 49 through a pipe 55 connecting with manifold 6ª as by a fitting 56. Thus if throttle arm 42 is resting against stop screw 44, resulting in a minimum speed of engine 5, and an excess of air is admitted through pipe 35ª, tending to destroy the vacuum existing in manifold 6ª, and thereby to stop the engine, the vacuum will also be reduced in casing 50 on the right side of diaphragm 49. This will partially balance the atmospheric pressure on the left side of diaphragm 49 and allow spring 54 to force it to the left, through tongue 52 and rod 53 causing clockwise rotation of arm 46. This will bring finger 47 into contact with abutment 48 and force throttle arm 42 in an opening direction against the slight closing force exerted by the governor under these conditions. This will prevent the engine from stalling.

Under light load conditions throttle arm 42 will be rotated somewhat in a clockwise direction by the governor in well-known manner, thus moving boss 48 upwardly and, if the load is great enough, out of the range of movement of finger 47. Under these conditions the action of arm 46 is not needed.

While I have shown the invention as applied to the bar of a mower, it will of course be evident that other implements may be controlled equally well. For example, in Fig. 3, I have shown diagrammatically the application of my invention to cultivator rigs. These may be lifted into inoperative position or dropped into operative position by means of the vacuum motor thus described.

It is intended, therefore, that the above description be purely illustrative, that variations in proportions and sizes be provided for and that the invention be limited only by the scope of the following claims.

What I claim is:

1. In a tractor having a gas engine including an inlet manifold, the combination of a cylinder on the tractor, a piston in the cylinder, a lifting lever pivoted on the tractor with one end coupled to the piston rod, an agricultural implement connected to the lever for lifting movement in response to rocking of the lever, a reversing valve mounted on the tractor, piping connecting the valve with opposite ends of the cylinder, a vent from the valve to the atmosphere, a connection between said valve and the inlet manifold of the gas engine, said valve having one position for connecting one end of said cylinder with said vent and the other end with said inlet manifold and having a second position for reversing said connections, and a spring connecting the free end of the lifting lever to the tractor frame and serving to supplement the lifting force of said vacuum cylinder, the said spring being overcome by the force of the vacuum during the lowering movement of said lifting lever.

2. In a tractor having a gas engine including an intake, the combination of an agricultural implement drawn by said tractor, a reversible motor on said tractor operated by the vacuum of said gas engine's intake, implement lifting means operated by said motor and supplemental lifting means cooperatively connected with said first named lifting means, said motor serving to overcome the force of said supplemental lifting means when operated in the non-lifting direction.

EDGAR A. CROSS.